United States Patent

[11] 3,533,475

[72] Inventor Houston H. Buchanan
Rte. 2, Box 145, Snyder, Texas 79549
[21] Appl. No. 860,176
[22] Filed Sept. 19, 1969
Continuation of Ser. No. 645,712,
June 13, 1967, now abandoned.
[45] Patented Oct. 13, 1970

[54] COMPENSATING TOOL BAR DEVICE
4 Claims, 5 Drawing Figs.
[52] U.S. Cl. ............................................. 172/484,
172/483, 172/413, 172/307
[51] Int. Cl. ........................................... A01b 63/02,
63/24, A01b 63/102
[50] Field of Search ......................................... 172/483,
484, 303, 307, 413, 449, 244, 417, 416, 439, 444,
445, 448, 449, 450, 451, 691, 692, 698, 265—268,
705, 708, 709, 711, 776

[56] References Cited
UNITED STATES PATENTS
2,747,484 5/1956 Fraga ........................... 172/307X
3,111,174 11/1963 Fry et al. ...................... 172/484X
3,135,339 6/1964 Fry et al. ...................... 172/484X
FOREIGN PATENTS
89,283 7/1960 Denmark ....................... 56/378

Primary Examiner—Robert E. Pulfrey
Assistant Examiner—Walter J. Conlon
Attorney—Christen & Sabol ABSTRACT: A compensating horizontal tool bar for agricultural implements is connected to another transverse horizontal support by two parallelogram connectors and a third connector midway between; the linkages are arranged so that when a linkage of the third connector is horizontal, the linkages of the outside parallelograms extend downwardly and rearwardly to permit the tool bar to tilt about a central axis while maintaining the bar's average height substantially constant.

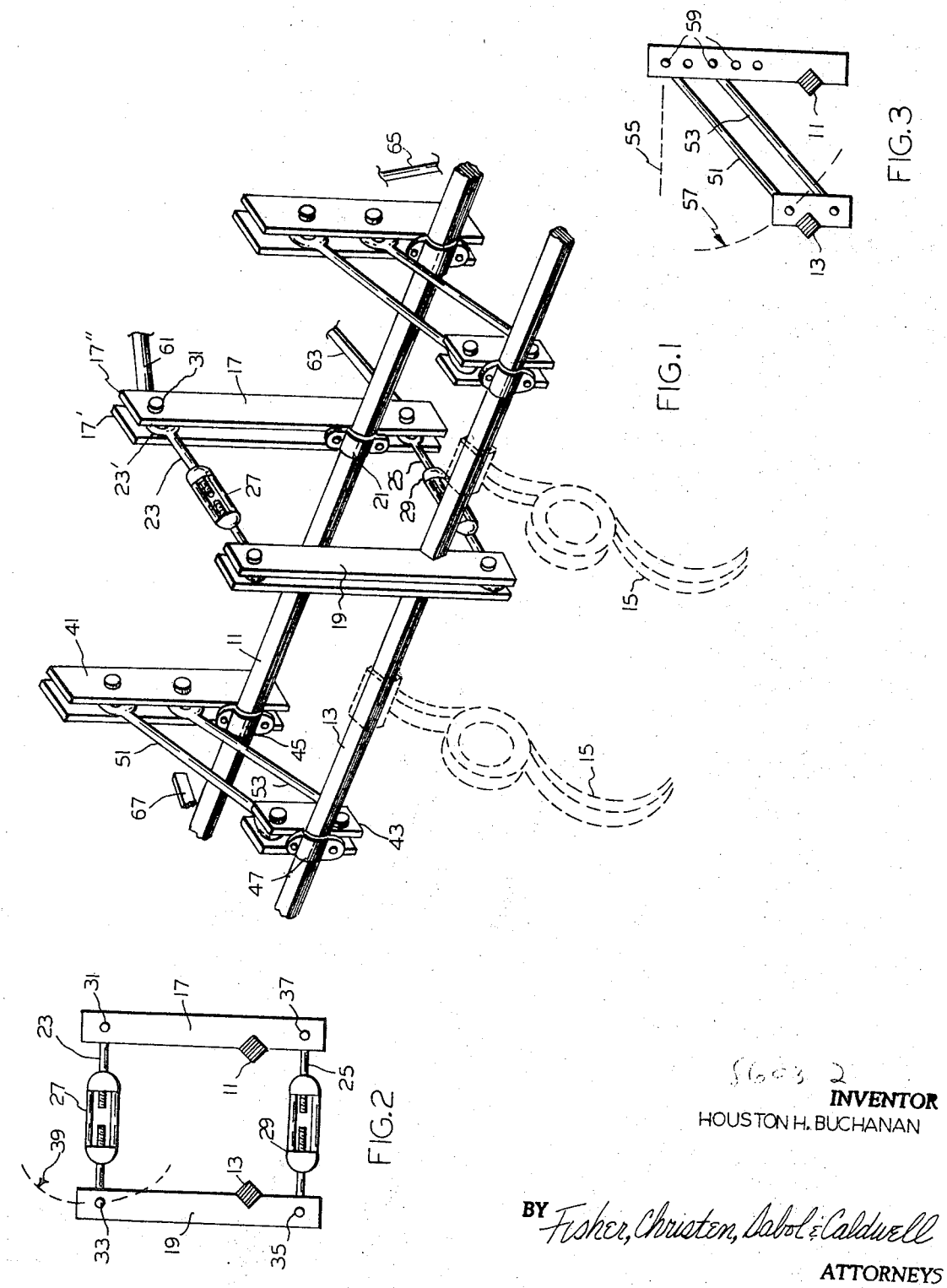

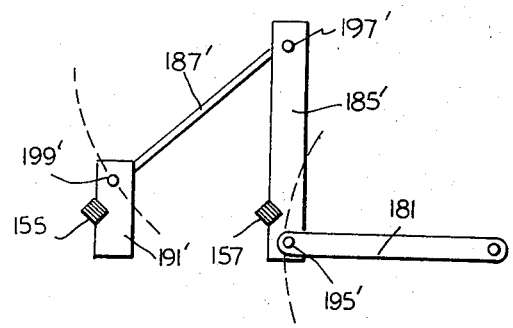
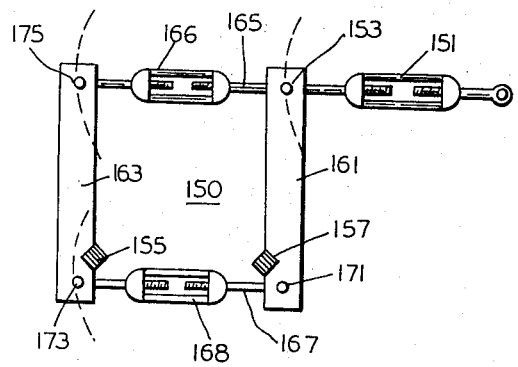
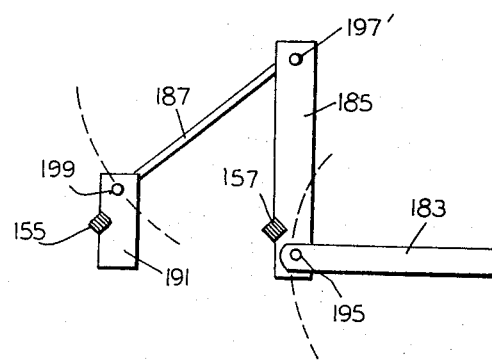
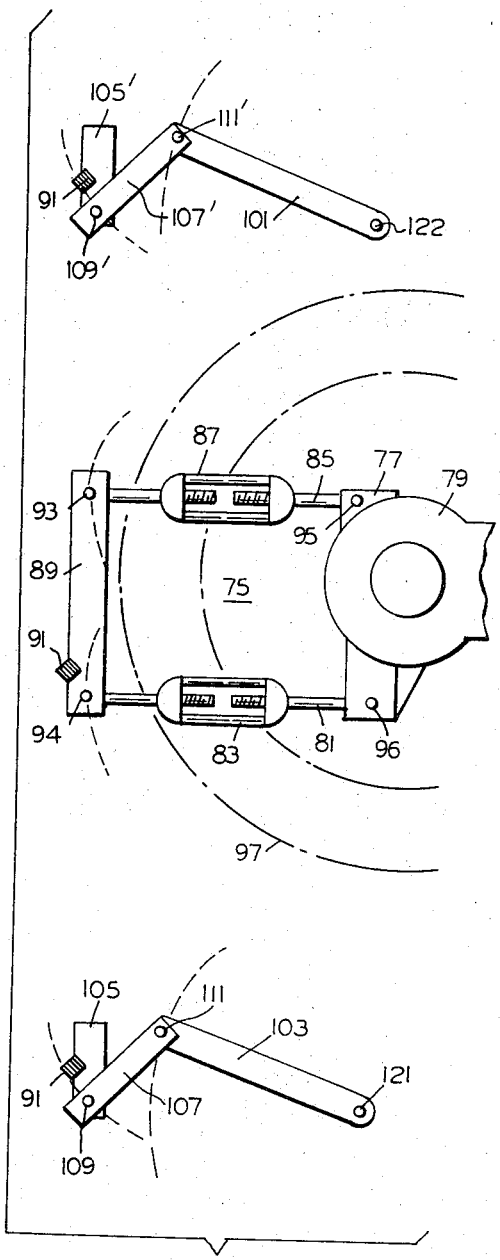
FIG.5
FIG.4
INVENTOR
HOUSTON H. BUCHANAN
BY Fisher, Christen, Sabol & Caldwell
ATTORNEYS

COMPENSATING TOOL BAR DEVICE

This is a continuation of application Ser. No. 645,712, filed June 13, 1967 and now abandoned.

The subject invention relates in general to soil engaging tools, and more particularly, to agricultural implements of a type employing elongated tool bars for mounting the soil engaging tools.

It is well known that, where long tool bars are employed, in an implement propelled by a tractor, frequently differentials are encountered in the drag resistance to the soil engaging tools at opposite ends of the tool bar which, in turn, impart considerable side drift to the tractor.

In addition, the tool bars do not run true, both as to vertical working and working at an angle perpendicular to the towing force, primarily due to ground unevenness and soil irregularities.

In line with these problems is also the problem of "walking" or skipping from side to side, which is commonly encountered where long tool bars are employed.

Another problem, although not so frequently recognized, is the fact that when towing an implement, it is desirable to direct maximum power forward even where side drag manifests itself and one object of the present invention is to overcome this problem, while permitting the apparatus to cope with rugged terrain, as well as hard pan and packed earth areas.

Briefly, the invention, in one embodiment, comprises an implement which employs two spaced apart elevated tool bars. Both of the bars carry the soil engaging tools in a depending manner therefrom and the front tool bar is adapted to be connected to the tractor. Between the two bars, there is provided a plurality of yieldable connections, each of parallelogram configuration and each permitting vertical and some lateral motion of one bar relative to the other bar.

This type arrangement enables the implement to be of a self-righting nature because one of the connections is centrally located and the other connections are spaced laternally therefrom. The center connection maintains substantially constant the distance between the bars at the center and the same elevation and when one end encounters increased drag through the tools supported adjacent thereto, the other skews oppositely, thus increasing the friction it encounters and thereby eliminating the unequal pull on the rear bar.

For example, if the tools on the right-hand end of the rear bar encounter firmer soil or rougher terrain, these tools are forced rearwardly and upwardly until the drag evens. In this manner the power of the tractor is concentrated in the direction of intended movement and the side drag is minimized.

Another feature of the invention resides in the fact that the center parallelogram connection preferably defines a right-angle parallelogram in normal use, whereas the side connections define parallelograms at an angle of preferably 40° to the horizontal. This arrangement appears to present the maximum stability while enabling the foregoing objectives.

Still another feature of the invention resides in providing the center parallelogram with adjustable arms, at least the horizontal arms. Then, by adjusting the upper arm slightly shorter than the lower arm, a slight twisting is imparted to the two tool bars because the uprisers of all of the parallelograms are rigidly affixed to the bars. It has been observed that this slight twisting prevents the walking or skipping from side to side which now makes the long tool bars more desirable for use in the immense fields found in our more expansive states.

Other embodiments of the invention also compensate for side drift but employ a center parallelogram between the bars or directly to the tractor with the lateral spaced supports permitting arcing of one pair relative to the other. However, these lateral supports are not parallelograms, but rather single arms which depend downwardly, for example at 40° to 45°, from a post connected to the front bar to the connection to the rear bar or directly from the tractor hookup in order that the tool carrying bar may tilt vertically or the second bar may tilt vertically relative to the first bar. In these arrangements, the hookup to the tractor ensures that the forward bar will be horizontal to, and spaced from, the rear wheels with the ends of the bar being able to rise and fall to compensate for side drift. With the center of the tool bar remaining in the same elevation and the distance to the center bar being fixed when one end of the tool bar has more drag, it will be pulled back and the other bar will arc up thus forcing the opposite end forward with the other end arcing downwardly until the drag is equal.

Of course, it will be appreciated that the principles of this invention are not only applicable to two bars, but to multiple bars with one behind the other; and, coupling to the tractor may be accomplished forward thereof or to the rear thereof.

These latter embodiments are partly applicable to bars coupled with long bars behind them wherein the long bar compensates for side drift and the coupling arrangement of the two bars permits coverage of double the number of rows.

Also, it will be appreciated that while the invention is illustrated and described herein with respect to its use as a chiseling device (one of the more strenuous uses), nevertheless it is equally useful in hoes, planters, cultivators, listers, and implements, in general, where the tool clamps to a tool bar.

With the foregoing in mind, it is among the objects of this invention to provide an improved compensating tool bar agricultural implement.

A further object is the provision of such an implement which employs at least a pair of parallel bars with bars carrying soil engaging tools and the forward bar coupling to tractor lift arms, the bars being yieldably connected together at spaced apart points by connecting means of parallelogram-shaped configurations.

Another object of the invention is the provision of such an implement in which the rear bar may move laterally and vertically relative to the forward bar, increasingly toward either end.

Yet another object of the invention is the provision of such an implement wherein the center connection parallelogram is of rectangular configuration and lateral connecting parallelograms or arms depend at approximately 40° from the horizon.

The invention will be better understood from a reading of the following detailed description thereof when taken in the light of the accompanying drawings wherein:

FIG. 1 is a view in perspective showing a typical implement, per se, under normal operating conditions, FIG. 2 is a view in side elevation of the center parallelogram connection, FIG. 3 is a view in side elevation of a typical laterally spaced connection, FIG. 4 is a segmented view in side elevation of a further modification of the invention, and FIG. 5 shows a similar view of a still further embodiment.

Referring now to the drawings, there is shown in FIG. 1 a forward elevated tool bar 11 and a rear elevated tool bar 13, in spaced-apart relation thereto. The rear bar carries the depending soil engaging tools 15, of which only two are shown, but the invention accommodates up to seven or more such tools for expansive operations. The tools 15 are shown by way of illustration and may be replaced by any number of different types of soil engaging tools.

The portions of bars 11 and 13 depicted, are shown connected together, at three spaced apart locations. The center location includes the rectangular parallelogram configuration comprising the vertical uprisers 17 and 19 rigidly affixed to the tool bars 11 and 13 by clamps, such as 21. The horizontal reaches or arms of the configuration comprise links 23 and 25 respectively, including turn buckles 27 and 29. Thus, the horizontal arms comprising links 23 and 25 may be adjusted for slightly different lengths relative to each other.

In addition, each of the uprisers 17 and 19 is shown as comprising a pair of spaced apart members, such as 17' and 17''. This facilitates the establishment of a joint between link 23 and upriser 17 which permits not only rotational movement of bar 13 relative to bar 11, but also some slight lateral movement thereof. A sphere or disc 23' is pinned between members 17' and 17" by pin or bolt 31, in such a manner as to permit the foregoing movements. Actually, link 23 may carry a socket for gripping sphere or disc 23' in conventional manner, or alternatively disc 23' may include a hard rubber center which is somewhat yieldable relative to its supporting pin 31. In such case, the junction is slightly on the sloppy side, i.e., the space between members 17' and 17" is sufficient to permit some lateral movement of link 23 in either the right-hand or left-hand direction.

As best seen in FIG. 2, the structure just described is depicted in right-angle configuration showing the preferred arrangement for normal use. Also, it should be appreciated that the parallelogram pins, such as 33 and 35, describe arcs about their associated pins 31 and 37, as illustrated at 39. This feature of the invention is also useful because it permits (e.g.) bar 13 to swing up as an end is pulled back, affording easier leverage control.

Two lateral connections, also of parallelogram configuration, are shown, but preferably only two are used with each rear bar, and two shorter bars can be used to the rear of a longer bar. The uprisers 41 and 43 are securely clamped to the bars 11 and 13, by clamps 45 and 47, which, of course, are effective, because the tool bars are recessed into the uprisers. A pair of arms 51 and 53 extend between the uprisers 41 and 43 and are coupled thereto in the manner heretofore explained.

However, it should be noted, as is apparent from FIG. 3, that arms 51 and 53 (for normal operation) depend at an angle of approximately 40° from the horizontal, indicated at 55. This relation is presented while the bars 11 and 13 are level with each other. Again, it may be appreciated that the arcing principle is maintained in these connections, as indicated at 57. Further adjustability is provided through the extra holes or pins 59.

The apparatus described is adapted for connection to a tractor (not shown) by way of links 61 and 63, as well as tractor lift arms 65 and 67.

The running depth of tools can be controlled in known manner such as with gauge wheels or from tractors depth control.

For purposes herein, normal operating conditions are defined as substantially level ground of approximately equal density such that all tools encounter about equal resistance.

FIG. 4 shows an embodiment of the invention adapted for connection directly to the rear of a tractor using a parallelogram type hitch and being a three point hookup. The parallelogram is shown at 75 and includes a forward post 77 connected to part 79 of the tractor which serves to center parallelogram 75. Lower arm 81 includes turn buckle 83, and upper arm 85 includes turn buckle 87. Rear post 89 carries the bar 91 fixed thereto, as by welding or the like. The arms 81 and 85 are pinned, or even more preferably, connected by conventional ball joints 93 through 96.

The lateral connections are identical and are connected to the tractor lift arms 101 and 102, being evenly spaced from the tractor center or parallelogram 75. The right-hand lateral connection comprises post 105 and arc or lever arm 107 with pins or ball joints 109 and 111 at opposite ends, bar 91 being fixed to post 105. The same numbers with primes affixed are employed on the left lateral connection.

The tractor arms 101 and 103 are up and down from their tractor connections 121 and 122 simultaneously, and thus the connections or ball joints 111 and 111' are horizontal with respect to each other and the tractor wheels, in all positions. The posts 105 and 105' may comprise two metal plates (one of each being removed for clarity) secured vertically relative to the tool bar 91 and in line with the tractor arms. The plates are spaced far enough apart to permit arc members 107 and 107' to turn freely on pins 109 and 109', but yet preclude lateral movement.

In normal operation the members 107 and 107' are at an angle of 40° to 45' relative to the horizon. This angle can be changed by lengthening or shortening turn buckles 83 and 87 in parallelogram 75. It is also apparent that the angles of members 107 and 107' must change as the bar is raised and lowered due to the difference in the arc of lift arms 101 and 103 and the turn buckles in parallelogram 75.

In operation when compensating for side drift, if the left-hand or upper end of the tool bar 91 encounters greater drag, it will be pulled back and bar 107' will arc up because the center parallelogram 75 holds the center of tool bar 91 the same distance from the tractor and thus, forces the opposite end (right end or lower end) forward and member 107 arcs downwardly until the drag is equal, the center of the tool bar remaining in its fixed elevation relative to the tractor.

When the embodiment of FIG. 1 is coupled behind the embodiment of FIG. 4, both the front and rear bars compensate for side drift in such a tandom arrangement, parallelogram 75 attaching to post 17 and lift arms 101 and 103 with members 107 and 107' attaching to the posts, such as 41.

A similar connector to that of FIG. 4 is disclosed in FIG. 5 wherein the forward end of parallelogram 150 is connected to tractor upper length turn buckle 151 at ball joint 153 to permit it to arc. The tool bars 155 and 157 are rigidly affixed to posts 161 and 163, in turn coupled together by upper arm 165 including turn buckle 166 and lower arm 167 with its turn buckle 168. Further pins or ball joints 171, 173, and 175 complete the parallelogram 150.

The lateral or spaced apart connections include tractor lift arms 181 and 183, vertical posts 185 and 185', arcing arms 187 and 187', and rear posts 191 and 191' with ball or pin connections 195, 195', 197, 197', and 199 and 199'.

The arms 187 and 187' are downward to the rear at 40° to 45° in normal operation. With this connection, it will be seen that the arc members 187 and 187' are different from the turn buckle arcs.

The effect of this hookup would be similar to employing a diagonal bar across the parallelogram 150, and thus the center of the rear tool bar 155 is held the same distance from the front tool bar 157 and at the same elevation. This permits the rear tool bar 155 to cross vertically the front tool bar 157, as the ends move up and down on tool bar 155 while the center of the bars remain on the same elevation.

The tractor lift arms 181 and 183 move up and down simultaneously and thus keep the front tool bar horizontal with the tractor's rear wheels. The turn buckle 151 makes the same angle as the lift arms 181 and 183 to keep the tools vertical and the two tool bars on the same elevation in all positions.

The purpose of turn buckles 166 and 168 is to raise and lower rear tool bar 155 relative to front tool bar 157 by lengthening turn buckles 166 and 168, the rear tool bar 155 must arc up, and when they are shortened, it must arc down. The center parallelogram 150 holds the desired angles until the length of the turn buckles 166 and 168 are again changed.

This arrangement permits the second tool bar 155 to compensate for side drift. For example, a two-row tractor covering two 40-inch rows with an 80-inch tool bar 157 forward permits the use of a 160-inch tool bar at 155 whereby the tools on the rear bar would cover 40 inches in either side of the front bar tools, and the rear or long tool bar would compensate for side drift while allowing the tractor to cover four rows instead of two.

While the invention has been shown and described in connection with its preferred arrangement, it will nevertheless occur to others skilled in the art that modifications may be made within the principles of the teaching herein.

I claim:

1. A compensating earth-working implement to be secured to a tractor comprising first and second horizontal transverse tool bar means, means for attaching the first tool bar means to a tractor hitch, two horizontally spaced parallelogram connection means, each of said parallelogram connection means including a first vertical upriser means secured to the first tool bar means, second vertical upriser means secured to the second tool bar means, and a pair of parallel vertically spaced linkage means extending between the respective upriser means and being loosely pivotally connected thereto at their respective opposite ends, third connector means extending between said first and second tool bar means and disposed approximately midway between said two parallelogram connection means, said third connector means comprising linkage means extending in a horizontal plane and being loosely pivotally connected to the respective tool bar means at the opposite ends when said tool bars are disposed approximately at the same elevation and the linkage means of the outer two parallelogram connection means being disposed at downwardly and rearwardly extending angles when the linkage means of the third connection means are disposed in said horizontal planes, whereby when one end of the second tool bar means is urged upwardly the other end of the second tool bar means will be urged in a downward direction.

2. The invention defined in claim 1, wherein said linkage means of said outer two parallelogram connection means are disposed at approximately 40° with respect to the horizontal when the said linkage means of the center parallelogram connection means is disposed in a horizontal plane.

3. The invention defined in claim 1, wherein said third connector means is a parallelogram connector means having two vertically spaced linkage means.

4. The invention defined in claim 3, wherein at least one of the linkage means of the center parallelogram connection means is longitudinally adjustable.